United States Patent
Kumar et al.

(10) Patent No.: US 10,764,264 B2
(45) Date of Patent: Sep. 1, 2020

(54) TECHNIQUE FOR AUTHENTICATING NETWORK USERS

(75) Inventors: Ravi Chakravarthi Kumar, Cupertino, CA (US); Tal I. Lavian, Sunnyvale, CA (US); Vasant Sahay, Sunnyvale, CA (US); Nirmalendu Das, Cupertino, CA (US); Biju Sajibhavan Kunjukunju, Cupertino, CA (US); David Burton Levi, Knoxville, TN (US); Philippe Michelet, Milpitas, CA (US); Shmuel Nehama, Saratoga, CA (US)

(73) Assignee: Avaya Inc., Santa Clara, CA (US)

( * ) Notice: Subject to any disclaimer, the term of this patent is extended or adjusted under 35 U.S.C. 154(b) by 2475 days.

(21) Appl. No.: 11/320,593

(22) Filed: Dec. 30, 2005

(65) Prior Publication Data

US 2007/0169171 A1    Jul. 19, 2007

Related U.S. Application Data

(60) Provisional application No. 60/698,053, filed on Jul. 11, 2005.

(51) Int. Cl.
*H04L 9/32* (2006.01)
*H04L 29/06* (2006.01)

(52) U.S. Cl.
CPC ............ *H04L 63/08* (2013.01); *H04L 63/102* (2013.01); *H04L 63/105* (2013.01)

(58) Field of Classification Search
CPC ....... H04L 63/08; H04L 63/105; H04L 63/32; H04L 63/1433
USPC ..................................................... 726/22–25
See application file for complete search history.

(56) References Cited

U.S. PATENT DOCUMENTS

| | | | |
|---|---|---|---|
| 6,744,808 B1 * | 6/2004 | Walley | H04B 1/707 375/140 |
| 7,178,166 B1 | 2/2007 | Taylor et al. | |
| 7,197,125 B1 * | 3/2007 | Prasad et al. | 379/201.02 |
| 7,284,000 B2 * | 10/2007 | Kuehr-McLaren et al. | 707/9 |
| 7,348,961 B1 * | 3/2008 | Shneidman | 345/156 |

(Continued)

FOREIGN PATENT DOCUMENTS

| EP | 0 465 016 | 6/1991 |
|---|---|---|
| EP | 1 339 199 | 8/2003 |

(Continued)

OTHER PUBLICATIONS

Louie, Oscar A.; Non-final Office Action; U.S. Appl. No. 11/320,603; dated Apr. 16, 2008; U.S. Patent and Trademark Office; Alexandria, VA.

(Continued)

*Primary Examiner* — Tongoc Tran
(74) *Attorney, Agent, or Firm* — Stevens & Showalter LLP

(57) ABSTRACT

A technique for authenticating network users is disclosed. In one particular exemplary embodiment, the technique may be realized as a method for authenticating network users. The method may comprise receiving, from a client device, a request for connection to a network. The method may also comprise evaluating a security context associated with the requested connection. The method may further comprise assigning the client device one or more access privileges based at least in part on the evaluation of the security context.

19 Claims, 5 Drawing Sheets

(56) References Cited

U.S. PATENT DOCUMENTS

| | | |
|---|---|---|
| 7,477,747 B2 | 1/2009 | Stieglitz et al. |
| 7,627,123 B2 | 12/2009 | Conway et al. |
| 8,707,395 B2 | 4/2014 | Sahay et al. |
| 2001/0034719 A1* | 10/2001 | Durand et al. .......... 705/65 |
| 2002/0010857 A1* | 1/2002 | Karthik .......... 713/168 |
| 2002/0031230 A1* | 3/2002 | Sweet et al. .......... 380/278 |
| 2002/0069278 A1 | 6/2002 | Forslöw |
| 2002/0103783 A1* | 8/2002 | Muhlestein .......... 707/1 |
| 2002/0178119 A1* | 11/2002 | Griffin et al. .......... 705/54 |
| 2003/0023864 A1* | 1/2003 | Muttik et al. .......... 713/200 |
| 2003/0048468 A1* | 3/2003 | Boldon et al. .......... 358/1.14 |
| 2003/0158823 A1* | 8/2003 | Fulton et al. .......... 705/75 |
| 2003/0221012 A1* | 11/2003 | Herrmann et al. .......... 709/229 |
| 2004/0078597 A1 | 4/2004 | Sun et al. |
| 2004/0083394 A1* | 4/2004 | Brebner et al. .......... 713/202 |
| 2004/0128508 A1* | 7/2004 | Wheeler et al. .......... 713/170 |
| 2004/0158741 A1* | 8/2004 | Schneider .......... 713/201 |
| 2004/0268145 A1* | 12/2004 | Watkins .......... G06F 21/57 726/24 |
| 2005/0021498 A1* | 1/2005 | Boreham et al. .......... 707/1 |
| 2005/0228886 A1* | 10/2005 | Cain et al. .......... 709/226 |
| 2005/0273346 A1* | 12/2005 | Frost .......... 705/1 |
| 2006/0005032 A1* | 1/2006 | Cain .......... H04L 63/105 713/182 |
| 2006/0105810 A1* | 5/2006 | Gnuschke .......... 455/558 |
| 2006/0156405 A1* | 7/2006 | Forman et al. .......... 726/24 |
| 2006/0174115 A1* | 8/2006 | Rao .......... G06F 21/577 713/168 |
| 2006/0177063 A1 | 8/2006 | Conway et al. |
| 2006/0179307 A1 | 8/2006 | Stieglitz et al. |
| 2006/0242685 A1 | 10/2006 | Heard et al. |

FOREIGN PATENT DOCUMENTS

| | | |
|---|---|---|
| WO | 9965207 A1 | 12/1999 |
| WO | WO 02/03178 | 1/2002 |

OTHER PUBLICATIONS

Louie, Oscar A.; Final Office Action; U.S. Appl. No. 11/320,603; dated Oct. 10, 2008; U.S. Patent and Trademark Office; Alexandria, VA.

Louie, Oscar A.; Advisory Action; U.S. Appl. No. 11/320,603; dated Dec. 16, 2008; U.S. Patent and Trademark Office; Alexandria, VA.

Louie, Oscar A.; Non-final Office Action; U.S. Appl. No. 11/320,603; dated Mar. 24, 2009; U.S. Patent and Trademark Office; Alexandria, VA.

Louie, Oscar A.; Final Office Action; U.S. Appl. No. 11/320,603; dated Jan. 21, 2010; U.S. Patent and Trademark Office; Alexandria, VA.

Louie, Oscar A.; Advisory Action; U.S. Appl. No. 11/320,603; dated Mar. 25, 2010; U.S. Patent and Trademark Office; Alexandria, VA.

Louie, Oscar A.; Non-final Office Action; U.S. Appl. No. 11/320,603; dated Apr. 15, 2011; U.S. Patent and Trademark Office; Alexandria, VA.

Louie, Oscar A.; Final Office Action; U.S. Appl. No. 11/320,603; dated Oct. 25, 2011; U.S. Patent and Trademark Office; Alexandria, VA.

Louie, Oscar A.; Advisory Action; U.S. Appl. No. 11/320,603; dated Dec. 30, 2011; U.S. Patent and Trademark Office; Alexandria, VA.

Traore, Fatoumata; Notice of Allowance; U.S. Appl. No. 11/320,603; dated Dec. 6, 2013; U.S. Patent and Trademark Office; Alexandria, VA.

Gerardus Veen; Written Opinion of the International Searching Authority; International Application No. PCT/US2006/027037; dated Oct. 25, 2006; European Patent Office; Rijswijk, Netherlands.

Kambiz Zand; International Preliminary Examination Report; International Application No. PCT/US2006/027037; dated Dec. 12, 2009; European Patent Office; Rijswijk, Netherlands.

Gerardus Veen, Examination Report, European Application No. 06787006.3; dated Aug. 5, 2013; European Patent Office; Rijswijk, Netherlands.

* cited by examiner

TECHNIQUE FOR AUTHENTICATING NETWORK USERS

CROSS-REFERENCE TO RELATED APPLICATIONS

This patent application claims priority to U.S. Provisional Patent Application No. 60/698,053, filed Jul. 11, 2005, which is hereby incorporated by reference herein in its entirety.

This patent application is related to U.S. patent application Ser. No. 11/320,603 (now U.S. Pat. No. 8,707,395), entitled "Technique for Providing Secure Network Access," filed Dec. 30, 2005, which is incorporated herein in its entirety.

FIELD OF THE DISCLOSURE

The present disclosure relates generally to network security and, more particularly, to a technique for authenticating network users.

BACKGROUND OF THE DISCLOSURE

To prevent unauthorized access, it is often necessary for a network to authenticate its users to ensure that each user is who he or she claims to be. Conventional user authentication methods typically involve a brief interaction between a user and a network, wherein the user provides to the network a security identifier such as a secret password, a token device, a digital certificate, a biometric key, or a combination thereof. The network then verifies the security identifier against records of authorized users.

Conventional user authentication methods only produce a binary result—pass or fail. That is, if a user provides a security identifier that cannot be verified by the network, the user will be denied access completely. If the user's security identifier can be successfully verified, the user is often granted full access to the network. In some networks, each authorized user may have predetermined access privileges also known as a "role." In this type of network, conventional user authentication methods still produce a binary result. That is, if the user is authenticated, he or she is assigned a predetermined role in the network. If the user is not authenticated, he or she will be completely locked out.

Except for a user-provided security identifier, conventional user authentication methods typically do not take into account any other factors in its decision to grant or deny access. That is, as long as a user enters a correct set of username and password, the user will be granted full access or a predetermined access privilege. In other words, conventional user authentication methods only care about who the user is, and do not pay attention to the circumstances in which the user accesses the network. Such conventional user authentication methods may make the network vulnerable to virus infections and/or malicious attacks. For example, a client device infected with virus may easily gain access to the network and put other devices at a greater risk of infection.

In addition, it is generally assumed that a network cannot trust client devices from which end-users access the network. Therefore, once a user disconnects from the network, the user's authentication with the network expires. The next time the user attempts to access the network, the user has to be re-authenticated. Even if the user does not leave the network but simply moves from one part of the network to another, the user may also have to go through a re-authentication process. To a network user, re-authentication can be inconvenient and sometimes annoying. For example, when roaming within a network, in each new location, a user may have to close some networked applications, get re-authenticated, and then restart the networked applications. As a result, in-network mobility may be burdened even for a legitimate user of the network.

Another problem with conventional user authentication methods lies in a general requirement that a client device requesting access to a network must be compatible with the authentication scheme supported by the network. A traditional network typically supports only one particular authentication scheme, which may be based on, for example, IEEE 802.1x standard, a Media Access Control (MAC) or Internet Protocol (IP) database, or Remote Authentication Dial In User Service (RADIUS) protocol. Such a network can only authenticate a client device that is pre-configured to work with the network's chosen authentication scheme. For example, a network that only supports the IEEE 802.1x standard may not be able to authenticate a client device that employs the RADIUS protocol. Some networks go even further by requiring trusted, proprietary client software to be pre-installed in client devices. These compatibility requirements tend to block otherwise legitimate users with incompatible devices and may cause frustration or dissatisfaction in network users.

In view of the foregoing, it would be desirable to provide a technique for authenticating network users which overcomes the above-described inadequacies and shortcomings.

SUMMARY OF THE DISCLOSURE

A technique for authenticating network users is disclosed. In one particular exemplary embodiment, the technique may be realized as a method for authenticating network users. The method may comprise receiving, from a client device, a request for connection to a network. The method may also comprise evaluating a security context associated with the requested connection. The method may further comprise assigning the client device one or more access privileges based at least in part on the evaluation of the security context.

In accordance with other aspects of this particular exemplary embodiment, the security context may be evaluated at least in part by an agent program in the client device. The agent program may interact with the network to evaluate the security context. At least a portion of the security context may be evaluated prior to the request for connection. The agent program may comprise a JAVA applet. The agent program may be automatically downloaded to the client device upon receipt of the request for connection. In addition, the agent program may remain in the client device, after the client device disconnects from the network, in preparation for a subsequent connection to the network.

In accordance with further aspects of this particular exemplary embodiment, the security context may comprise one or more factors selected from a group consisting of: a user login mechanism employed by the client device, a threat level associated with the network, vulnerabilities of an access medium with which the client device connects to the network, and a security level associated with the client device.

In accordance with additional aspects of this particular exemplary embodiment, the method may further comprise generating a security token that records the one or more access privileges assigned to the client device and storing the security token in the client device. The method may also comprise detecting the security token in the client device when the client device, after ending a first connection to the network, attempts a second connection to the network and granting the client device access to the network based on the one or more recorded access privileges if the security token is detected and verified. The first and the second may connection to the network are through different ports.

In accordance with a further aspect of this particular exemplary embodiment, the method may further comprise generating a security token that records at least a portion of the security context and storing the security token in the client device. The method may also comprise: detecting the security token in the client device when the client device, after ending a first connection to the network, attempts a second connection to the network, and granting the client device access to the network based at least in part on the recorded security context if the security token is detected and verified. The recorded security context may be updated prior to the client device's attempt of the second connection to the network.

In accordance with a yet further aspect of this particular exemplary embodiment, the method may comprise configuring a connection between the client device and the network based at least in part on the evaluation of the security context. The method may also comprise re-configuring the connection between the client device and the network based at least in part on a security token stored in the client device.

In another particular exemplary embodiment, the technique may be realized as at least one signal embodied in at least one carrier wave for transmitting a computer program of instructions configured to be readable by at least one processor for instructing the at least one processor to execute a computer process for performing the method as recited above.

In yet another particular exemplary embodiment, the technique may be realized as at least one processor readable carrier for storing a computer program of instructions configured to be readable by at least one processor for instructing the at least one processor to execute a computer process for performing the method as recited above.

In still another particular exemplary embodiment, the technique may be realized as a system for authenticating network users. The system may comprise a network interface that facilitates communications between a client device and a network. The system may also comprise at least one processor that receives, from a client device, a request for connection to the network, causes a security context associated with the requested connection to be evaluated, and assigns the client device one or more access privileges based at least in part on the evaluation of the security context.

In another particular exemplary embodiment, the technique may be realized as a method for authenticating network users. The method may comprise receiving, from a client device, a request for connection to a network. The method may also comprise identifying a communication protocol employed by the client device. The method may further comprise adopting an authentication scheme that is compatible with the communication protocol, if the compatible authentication scheme is available for use by the network to authenticate the client device. The method may additionally comprise downloading an agent program to the client device if the compatible authentication scheme is not available, wherein the agent program interacts with the network to authenticate the client device.

In accordance with other aspects of this particular exemplary embodiment, the compatible authentication scheme may be selected from a group consisting of: authentication schemes associated with IEEE 802.1x standard, authentication schemes based on one or more Media Access Control (MAC) address lists, authentication schemes based on one or more Internet Protocol (IP) address lists, and authentication schemes based on Remote Authentication Dial In User Server (RADIUS) protocol.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Exemplary embodiments of the present disclosure are described below. In one particular exemplary embodiment, an authentication technique may take into account a security context associated with a requested connection between a client device and a network. The security context may be evaluated through an interaction between the network and an agent program on the client device. Based on the evaluation of the security context, one or more access privileges (or "roles") may be assigned to the client device. The security context and/or the assigned access privilege(s) may be recorded in a security token which may be stored in the client device for use in a subsequent access to the network. The client device may later be permitted to re-connect to the network, without re-authentication, if the security token in the client device can be detected and verified.

As used herein, the term "network" refers to one or more interconnected devices, such as routers, switches and servers. In most instances, a network includes a plurality of interconnected devices that form, for example, one or more local area networks (LANs) and/or wide area networks (WANs). In some instances, however, a network may include a single device, such as a single computer as a host or a server. Many of the authentication functions as described below may be performed either by a central or dedicated device (e.g., a central or dedicated computer) or by a plurality of devices (e.g., access-point switches).

Figure 1:
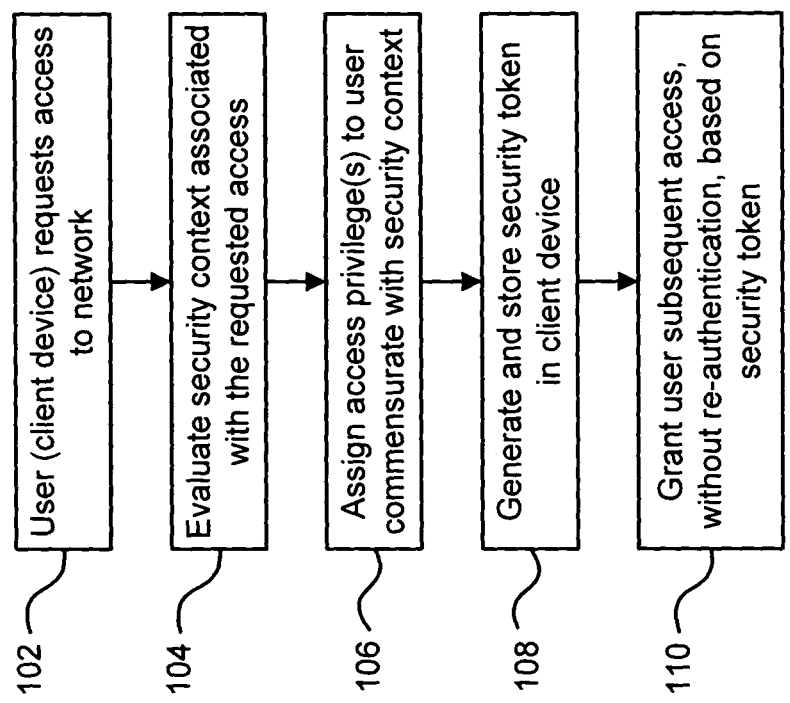
FIG. 1 shows a flow chart outlining an exemplary method for authenticating network users in accordance with an embodiment of the present disclosure.

Referring to FIG. 1, there is shown a flow chart outlining an exemplary method for authenticating network users in accordance with an embodiment of the present disclosure.

In step 102, a user or a client device may request access to a network. The user may request access to the network by logging in with, for example, a secret password or other security identifier. Typically, the user may request access from a client device such as, for example, a personal computer (PC), a UNIX terminal, a wireless personal digital assistant (PDA) device, or even a mobile telephone. Alternatively, the access request may be made by a client device on its own, that is, without intervention of a user. In either case, from the network's perspective, it is the client device that is directly communicating with the network.

If the user or client device provides login information (e.g., a username and password) in the access request, the network may perform some initial verification of the user or client device identity. Such identification may provide a basis for subsequent processes. For example, if the user or client device cannot be verified at all, access to the network may be immediately denied. According to some embodiments, however, the access request may not necessarily involve a login mechanism or any input of security identifiers. The client device may simply be plugged into a port of the network, be detected inside the network, or transmit a message to a network element requesting connection.

In step 104, a security context associated with the requested access or connection may be evaluated. The security context may comprise information related to potential security issues that might arise out of a connection between the client device and the network. For example, the security context may include information related to one or more of the following factors: a user login mechanism, current or projected network threat levels, vulnerabilities of the access medium used in the proposed connection, and a security level of the client device. The security context may indicate how big a threat to the network the client device might be if it is allowed to connect to the network.

The evaluation of the security context may be carried out in a number of ways. Most preferably, the evaluation of the security context may be performed through an interaction between the network and the client device so that security information of both the network and the client device may be covered. For example, an agent program may be downloaded to the client device, if such a program is not yet available therein, and the agent program may interact with the network to evaluate the security context. Alternatively, the evaluation of the security context may be performed by either the network or the client device alone. Timing of the evaluation of the security context may also be flexible. For example, an agent program may scan the client device for potential security threats even before the client device requests to access the network. Thus, at least a portion of the security context may be available when a new network connection is attempted. Time-sensitive security information may be obtained at or near the time when a new connection is attempted.

In step 106, the user or client device may be assigned one or more access privileges that are commensurate with the current security context. That is, a role may be assigned to the user or client device according to a potential threat level estimated for the requested connection. Generally, a higher potential threat level may require a more restrictive role for the client device. For example, if it is determined that the client device does not have the most up-to-date client software, or if viruses are found in the client device, a "read-only" or "browse-only" restriction may be imposed on the client device's access privileges. If the user logged in with both a token device and a secret password, the user may be given more access rights than if he or she only provided the secret password. If the client device is plugged into a physical port in a known secure location, the client device may be assigned more access rights than if it were roaming in a non-secure wireless area. From these examples, it may be understood that a role assigned to a network user or a client device may not be a predetermined one. Rather, the role may vary based on the security context in which the user or the client device connects to the network. Since the assignment of access privileges may be adaptive to the current security conditions, it may provide a better protection against virus infections and malicious attacks.

In step 108, a security token may be generated for storage in the client device. The security token may be an electronic record, preferably encrypted, that comprises the security context and/or the access privileges assigned to the client device. The security token may be generated by the network and downloaded to the client device. Alternatively, the security token may be generated by the agent program in the client device and stored therein. A replicate of the security token or its content may also be stored in the network.

In step 110, if, after disconnecting from the network, the client device attempts another connection, the network may grant the client device access privileges, without re-authentication, based on the security token. For example, if the network detects the security token and verifies its content, the network may assign the client device access privileges that are the same as or similar to those assigned in a previous connection. The security token may or may not be the same as the one downloaded to the client device in its previous connection. According to one embodiment, the agent program may continue to monitor the client device and update the security token. Therefore, in a subsequent connection, the network may assign a new role to the client device based on the updated security context in the security token.

Figure 2:
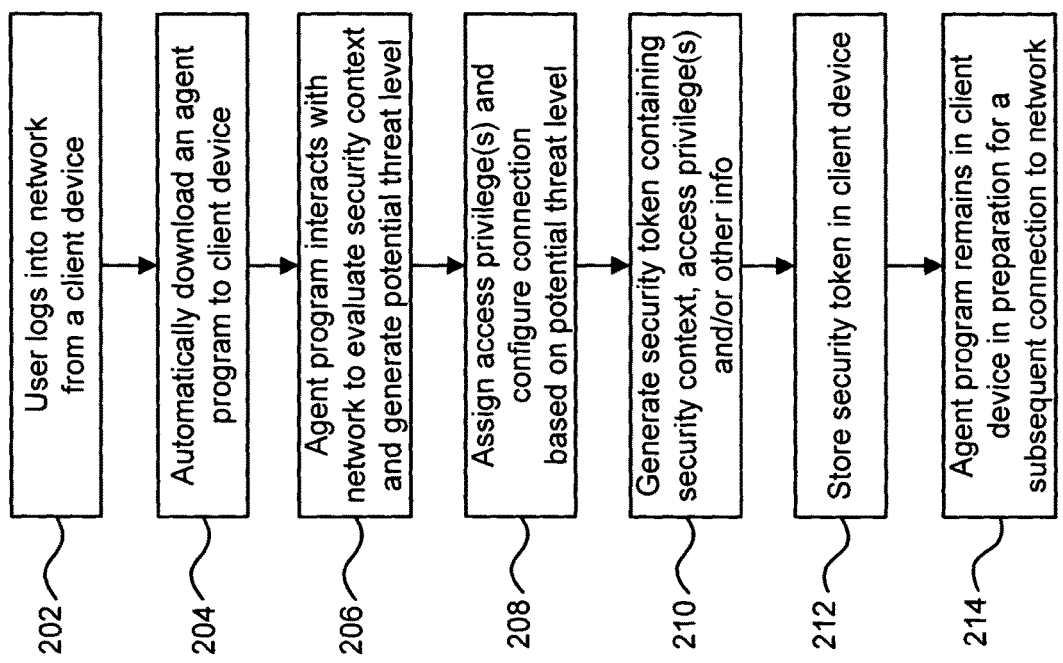
FIG. 2 shows a flow chart illustrating an exemplary method for authenticating network users in accordance with an embodiment of the present disclosure.

FIG. 2 shows a flow chart illustrating an exemplary method for authenticating network users in accordance with an embodiment of the present disclosure.

In step 202, a user may log into a network from a client device. Upon the user's successful login, an agent program, such as a JAVA applet, may be automatically downloaded to the client device in step 204.

In step 206, the agent program may interact with the network to evaluate a security context associated with the requested access. For example, the agent program may scan the client device for viruses, spywares or other malicious programs. The agent programs may also verify the hardware and software environment of the client device (e.g., trusted operation system, updated security patches, etc.). Coordinating with the network, the agent program may also identify vulnerabilities of the access medium via which the client device connects to the network. In addition, the network may report its current security conditions to the agent program. Based on the security information, the agent program may generate a threat level for the proposed connection. The threat level may be simple pass-or-fail assessment. Preferably, the threat level may be presented on a scale of multiple values to describe the security context with more granularity.

In step 208, access privileges may be assigned to the client device based at least in part on the threat level generated in step 206. Some embodiments of the present disclosure do not exclude the possibility of predetermined access privileges or roles. For example, a predetermined role (e.g., "administrator," "general user," or "guest") may be associated with a username. However, after a user with this username logs in, the access privileges associated with the predetermined role may be either maintained or modified depending on the threat level. Alternatively, there may be no predetermined roles and the access privileges may be assigned on an ad hoc basis (i.e., user-by-user and connection-by-connection). In addition to the assignment of access privileges, the connection between the client device and the network may be configured based on the evaluation of the security context. For example, a client device from a high-risk location may be required to communicate with the network through heavily encrypted messages. Conversely, for a client device connected to a trusted port of the network, encryption requirement may be less stringent. Further, a rate limit may be imposed on traffic between the client device and the network based on the potential threat level. Access privilege for a specific user may be enforced from a policy manager (or server) based on the user authentication status and security context of the client device.

In step 210, a security token may be generated. The security token may record at least a portion of the security context and the threat level, the access privileges assigned to the client device, and/or other information related to the current connection (e.g., encryption mechanism, transfer rate limit, etc.).

In step 212, the security token may be stored in the client device. For example, the security token may have been generated in the network and then downloaded to the client device. While stored in the client device, the security token is preferably protected from unauthorized tampering. Alternatively, or in addition, the network may maintain a copy or a digital signature of the security token's content so that any unauthorized changes to the security token may be detected.

In step 214, the agent program downloaded to the client device may remain therein in preparation for a subsequent connection to the network. That is, the agent program may become persistent in the memory or other storage of the client device even if it is disconnected from the network. The agent program may continue to monitor the client device or otherwise perform security scan(s) before or at its next attempt to access the network. Security scans such as virus or spyware scans are typically time-consuming processes. Therefore, it may be desirable to perform these scans prior to a subsequent connection to the network so that at least that portion of the security context will be available for evaluation when needed.

Figure 3:
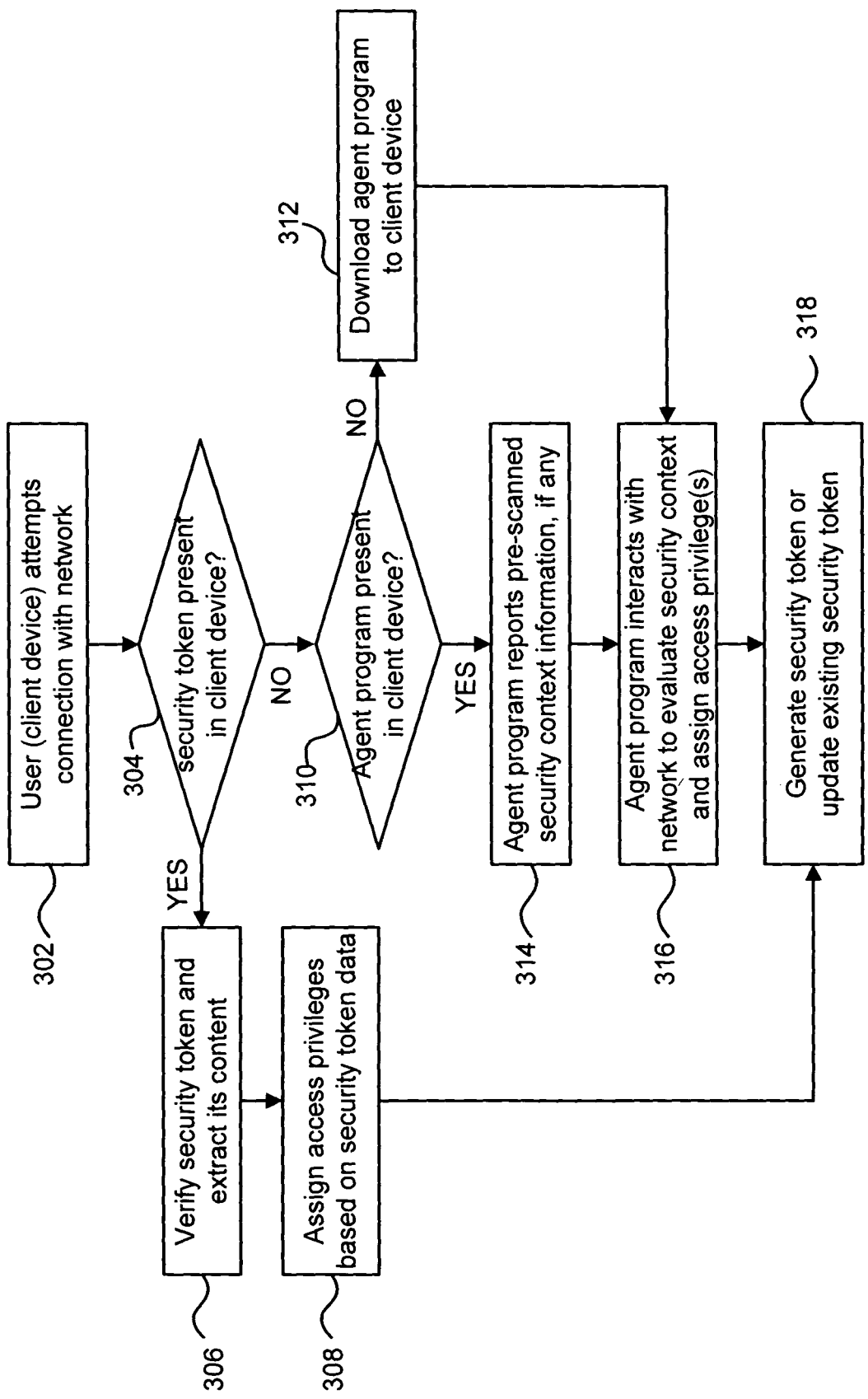
FIG. 3 shows a flow chart illustrating another exemplary method for authenticating network users in accordance with an embodiment of the present disclosure.

Referring to FIG. 3, there is shown a flow chart illustrating another exemplary method for authenticating network users in accordance with an embodiment of the present disclosure.

In step 302, a user or a client device may attempt to connect to a network. In step 304, it may be determined whether a security token is present in the client device.

If a security token is present in the client device, then, in step 306, the network may verify the security token, for example, against a digital signature or a copy of a valid security token. If the security token is successfully verified, its contents may be extracted. For example, a security context (related to last connection or subsequently updated) may be among the security token's contents. Based on the security context, the network may, in step 308, instantly assign access privileges to the client device without re-authentication. The process may then continue in step 318.

If a security token is not present in the client device, it may be determined, in step 310, whether an agent program (known as a "Tunnel Guard") is present in the client device. If a Tunnel Guard is not present, one copy of the agent program may be downloaded to the client device in step 312, and the process may then continue in step 316. If a Tunnel Guard is present in the client device, then, in step 314, the agent program may report its pre-scanned security context information to the network.

In step 316, the agent program may interact with the network to evaluate a security context associated with the current connection, and access privileges may be assigned to the client device based on the evaluation.

In step 318, a new security token may be generated and downloaded to the client device. Alternatively, an existing security token in the client device may be updated with the new security context or access privileges.

Figure 4:
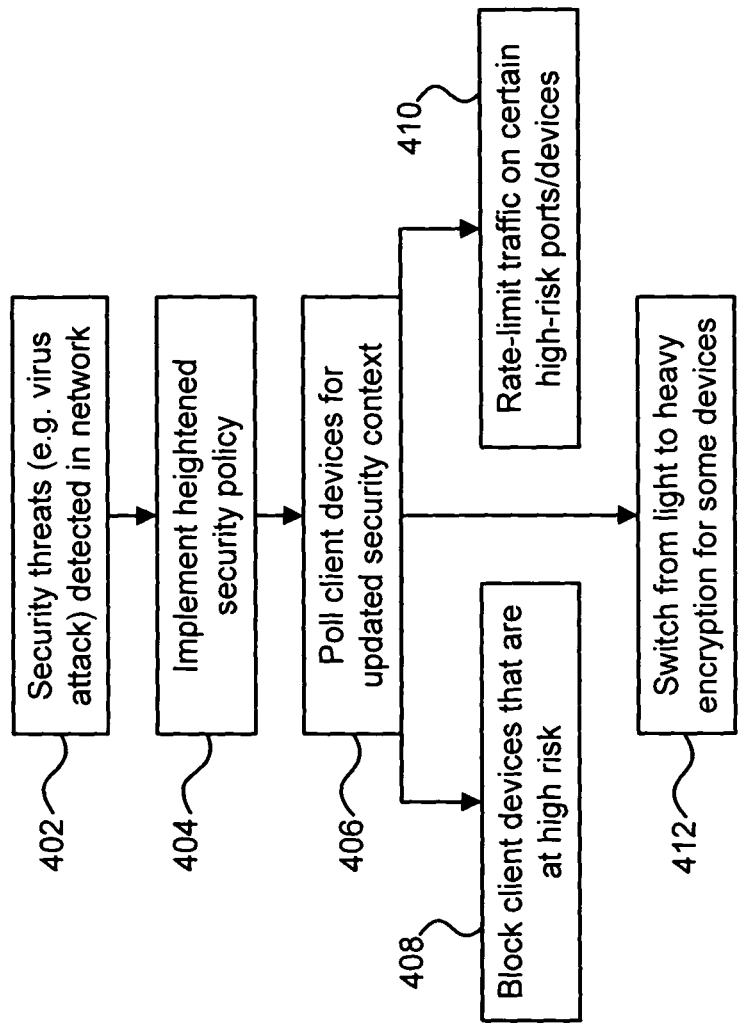
FIG. 4 shows a flow chart illustrating an exemplary method for enhancing network security in accordance with an embodiment of the present disclosure.

In addition to the convenience of re-admitting network users or client devices without re-authentication, embodiments of the present disclosure may also help improve network security when the users or devices are connected to the network. FIG. 4 shows a flow chart illustrating an exemplary method for enhancing network security in accordance with an embodiment of the present disclosure.

In step 402, one or more security threats, such as virus attacks or denial of service (DoS) attacks, may be detected in a network that employs the authentication technique according to embodiments of the present disclosure. There may be one or more client devices connected to the network, wherein the client devices have been authenticated and have security tokens stored therein.

In step 404, the network may start to implement a heightened security policy in light of the security events. According to one embodiment, a policy server may be employed for security management. The policy server may be triggered by one or more security events detected by the agent program in the client device or by one or more network-level alerts. The policy server may then enforce specialized policies designed for a specific client, port, or network segment.

In step 406, client devices in the network may be polled for their respectively updated security context. Each client device may have a persistent agent program that keeps updating its security token with most up-to-date security information. Upon receipt of a polling instruction, the agent program may report a current security context to the network.

Based on the security context collected from the client devices, it may be determined which client devices, network devices/ports, or portions of the network are more vulnerable to the detected security threats or more critical to the spread of the security threats. Accordingly, the network may take coordinated measures to battle or mitigate the security threats. For example, in step 408, those client devices at a high risk may be temporarily blocked from accessing the network or may be required to go through re-authentication. Certain critical devices or portions of the network may be quarantined. In step 410, network traffic on certain high-risk ports or devices may be rate-limited. In step 412, encryption mechanisms for some devices may be changed from light encryption to heavy encryption.

Figure 5:
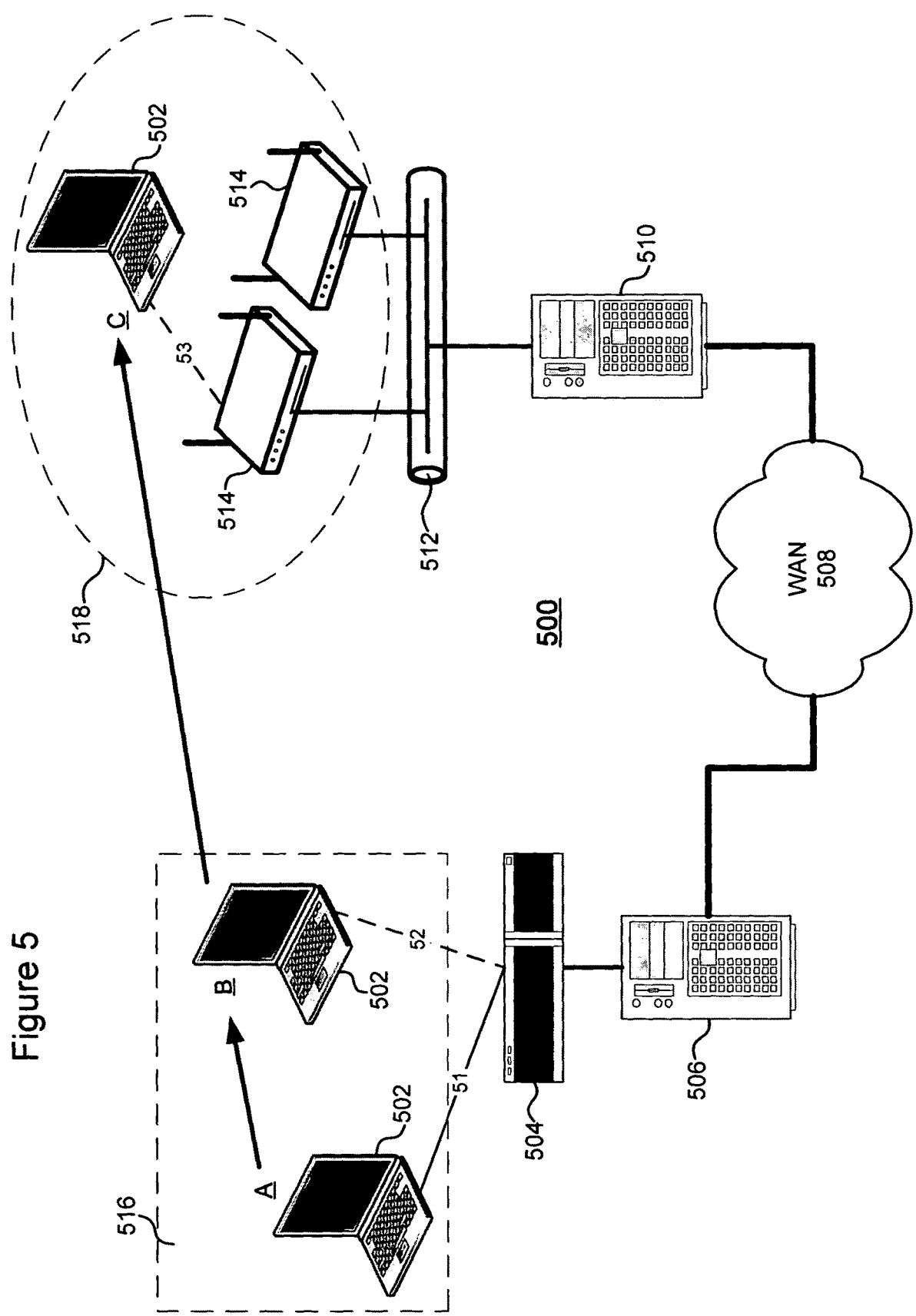
FIG. 5 shows a block diagram illustrating an exemplary system for authenticating network users in accordance with an embodiment of the present disclosure.

FIG. 5 shows a block diagram illustrating an exemplary system 500 for authenticating network users in accordance with an embodiment of the present disclosure. The system 500 may comprise a network having a switch 504, a first server 506, a WAN 508, a second server 510, an Ethernet medium 512, and wireless routers 514. The switch 504 and the first server 506 may provide physical network connections for a client device 502 in a first area 516. The first server 506 may be coupled to the second server 510 via the WAN 508. The second server 510 may be coupled to the wireless routers 514 via the Ethernet medium 512. The wireless routers 514 may provide network access to the client device 502 in a second area 518.

A user working on the client device 502 may establish a first connection 51 to the network via a first port on the switch 504. For the connection 51, the user may be authenticated and assigned access privileges based on a security context associated with the client device 502 and the connection 51. A security token containing the security context and/or the assigned access privileges may be downloaded to the client device 502.

Then, if the user decides to move from location A to location B inside the first area 516, for example, from the user's office to a conference room, the connection 51 may have to be terminated. According to embodiments of the present disclosure, when the client device 502 is unplugged from the switch 504, there may be no need to terminate any networked applications on the client device 502. In location B, the user may plug the client device 502 back to the network, e.g., on a different port of the switch 504. The switch 504 (or the server 506) may recognize the security token in the client device 502. Therefore, the network may re-admit the user and establish a new connection 52 without re-authenticating the user. The networked applications may continue running on the client device 502 without restarting.

Later on, if the user decides to roam even further on the network, the user may unplug the client device 502 to terminate the connection 52 and move to the second area 518. The client device 502 may establish another connection 53 with the wireless routers 514, again without re-authentication or restarting the networked applications. The routers 514 may detect and verify the security token in the client device 502. For example, a copy or a digital signature of the security token generated earlier may be stored in the server 506 or another central storage device. The routers 514 (or the server 510) may retrieve the stored security token (or its digital signature) and use it to verify the security token found in the client device 502.

According to some embodiments of the present disclosure, a network or a network element therein may be adapted to support multiple authentication schemes. The multiple authentication schemes may include one or more schemes based on the IEEE 802.1x standard. The multiple authentication schemes may also include one or more schemes based on a local or centralized MAC or IP address list. That is, a network element such as an edge switch or an access controller/server may maintain one or more lists of trusted MAC or IP addresses. A client device may be authenticated by verifying its MAC or IP information against the trusted list(s). Further, the multiple authentication schemes may include one or more schemes in which a Tunnel Guard (TG) may be dynamically downloaded to a client device to facilitate authentication and/or other functions. When a client device requests access to the network, one of the multiple authentication schemes may be dynamically adopted based on a determination of the client device's type and/or behavior. For example, if it is determined that the client device supports a particular authentication scheme that is also supported by the network, this particular authentication scheme may be adopted. Otherwise, the network may adopt a fallback scheme to authenticate the client device. Table 1 lists exemplary authentication schemes that may be adopted according to the client device's type and behavior.

TABLE 1

Exemplary Authentication Schemes
Based On Client Device Type and Behavior

| Client Device Type & Behavior | Adopted Authentication Scheme | Fallback Authentication Scheme |
| --- | --- | --- |
| 802.1x Device (Dynamic IP i.e. device does DHCP) | If the device starts speaking 802.1x, authentication will be done by 802.1x. If the device does not starts speaking 802.1x, authentication will be done by TG. | When the 802.1x or TG authentication fails the switch may still try to authenticate the client device using a local or centralized MAC database. |
| Non 802.1x Device (Dynamic IP) | Authentication will be done by TG. | When the TG authentication fails the switch may still try to authenticate the client device using a local or centralized MAC database. |
| 802.1x Device (Static IP i.e. device does not do DHCP) | Authentication will be done by 802.1x. | When the 802.1x authentication fails the switch will still try to authenticate the client device using a local or centralized MAC + IP database. |
| Non 802.1x Device (Static IP) | Authenticate the client device using a local or centralized MAC + IP database. | Block access. |

At this point it should be noted that the technique for authenticating network users in accordance with the present disclosure as described above typically involves the processing of input data and the generation of output data to some extent. This input data processing and output data generation may be implemented in hardware or software. For example, specific electronic components may be employed in a computer and/or communications network or similar or related circuitry for implementing the functions associated with authentication of network users in accordance with the present disclosure as described above. Alternatively, one or more processors operating in accordance with stored instructions may implement the functions associated with authentication of network users in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for authenticating network users comprising the steps of:
   receiving, from a client device, a request for connection to a network;
   receiving, from the client device, a security context associated with the requested connection, wherein at least a portion of the security context is obtained by the client device prior to the request for connection to the network by scanning the client device for potential security threats before the client device requests to access the network using an agent program previously downloaded to the client device before the request for connection was received;
   evaluating the security context associated with the requested connection;
   assigning the client device one or more access privileges based at least in part on the evaluation of the security context;
   generating a security token that records the one or more access privileges assigned to the client device; and
   downloading the security token to the client device.

2. The method according to claim 1, wherein the agent program interacts with the network to evaluate the security context.

3. The method according to claim 1, wherein the agent program comprises a JAVA applet.

4. The method according to claim 1, wherein:
   the agent program remains in the client device, after the client device disconnects from the network, in preparation for a subsequent connection to the network.

5. The method according to claim 1, wherein the security context comprises one or more factors selected from a group consisting of:
   a user login mechanism employed by the client device;
   a threat level associated with the network;
   vulnerabilities of an access medium with which the client device connects to the network; and
   a security level associated with the client device.

6. The method according to claim 1, further comprising:
   storing the security token in the client device.

7. The method according to claim 6, further comprising:
   detecting the security token in the client device when the client device, after ending a first connection to the network,
   attempts a second connection to the network; and
   granting the client device access to the network based on the one or more recorded access privileges if the security token is detected and verified.

8. The method according to claim 7, wherein the first and the second connections to the network are through different ports.

9. The method according to claim 1, further comprising:
   generating a security token that records at least a portion of the security context; and
   storing the security token in the client device.

10. The method according to claim 8, further comprising:
    detecting the security token in the client device when the client device, after ending a first connection to the network, attempts a second connection to the network; and
    granting the client device access to the network based at least in part on the recorded security context if the security token is detected and verified.

11. The method according to claim 10, wherein the recorded security context is updated prior to the client device's attempt of the second connection to the network.

12. The method according to claim 1, further comprising:
    configuring a connection between the client device and the network based at least in part on the evaluation of the security context.

13. The method according to claim 12, further comprising:
    re-configuring the connection between the client device and the network based at least in part on a security token stored in the client device.

14. A system for authenticating network users, the system comprising:
    a network interface that facilitates communications between a client device and a network; and
    at least one processor that:
    receives, from a client device, a request for connection to the network;
    receives, from the client device, a security context associated with the requested connection, wherein at least a portion of the security context is obtained by the client device prior to the request for connection to the network by scanning the client device for potential security threats before the client device requests to access the network using an agent program previously downloaded to the client device before the request for connection was received;
    causes the security context associated with the requested connection to be evaluated;
    assigns the client device one or more access privileges based at least in part on the evaluation of the security context;
    generates a security token that records the one or more access privileges assigned to the client device; and
    downloads the security token to the client device.

15. The system of claim 14 wherein the security context comprises one or more factors selected from a group consisting of:
    a user login mechanism employed by the client device;
    a threat level associated with the network;
    vulnerabilities of an access medium with which the client device connects to the network; and
    a security level associated with the client device.

16. A non-transitory computer readable storage medium having computer readable code thereon for authenticating network users, the medium including instructions in which a computer system performs operations comprising:
    receiving, from a client device, a request for connection to a network;
    receiving, from the client device, a security context associated with the requested connection, wherein at least a portion of the security context is obtained by the client device prior to the request for connection to the network by scanning the client device for potential security threats before the client device requests to access the network using an agent program previously downloaded to the client device before the request for connection was received;
    evaluating the security context associated with the requested connection;
    assigning the client device one or more access privileges based at least in part on the evaluation of the security context;

generating a security token that records the one or more access privileges assigned to the client device; and downloading the security token to the client device.

17. The computer readable storage medium of claim 16 wherein the security context comprises one or more factors selected from a group consisting of:

a user login mechanism employed by the client device;

a threat level associated with the network;

vulnerabilities of an access medium with which the client device connects to the network; and a security level associated with the client device.

18. The method according to claim 1, wherein assigning the client device one or more access privileges based at least in part on the evaluation of the security context further comprises assigning the client a data rate based on the evaluation of the security context.

19. The method according to claim 1, further comprising:

detecting a security event after assigning the client device access privileges;

reassigning the client device access privileges based at least in part on the evaluation of the security context and the detected security event.

* * * * *

UNITED STATES PATENT AND TRADEMARK OFFICE
CERTIFICATE OF CORRECTION

PATENT NO. : 10,764,264 B2
APPLICATION NO. : 11/320593
DATED : September 1, 2020
INVENTOR(S) : Kumar et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2881 days.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*